April 4, 1950 R. MEYER 2,503,120
HIGH-SPEED RAIL VEHICLE
Filed Aug. 7, 1947 2 Sheets-Sheet 1
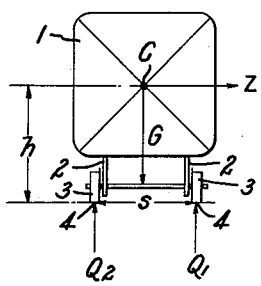
Fig. 1.
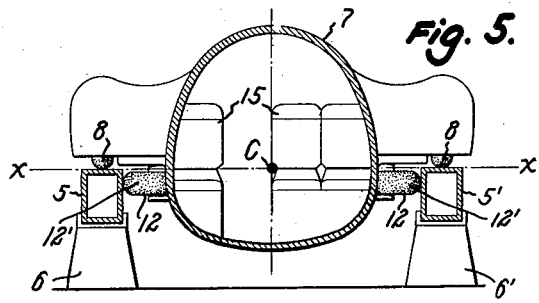
Fig. 5.
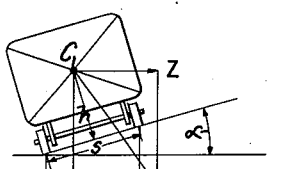
Fig. 2a.
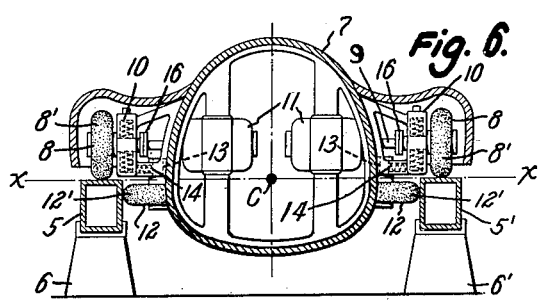
Fig. 6.
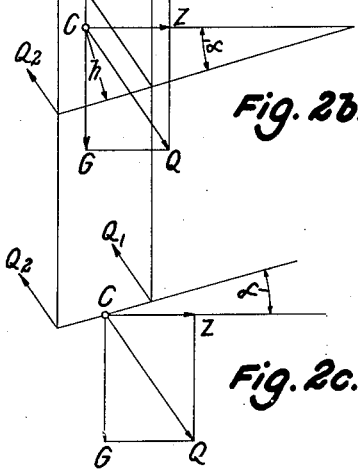
Fig. 2b.
Fig. 2c.
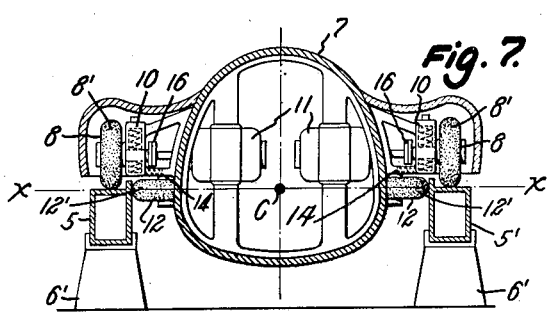
Fig. 7.
INVENTOR.
Rudolph Meyer
BY Pierce, Scheffler & Parker
Attorneys April 4, 1950 R. MEYER 2,503,120
HIGH-SPEED RAIL VEHICLE
Filed Aug. 7, 1947 2 Sheets-Sheet 2
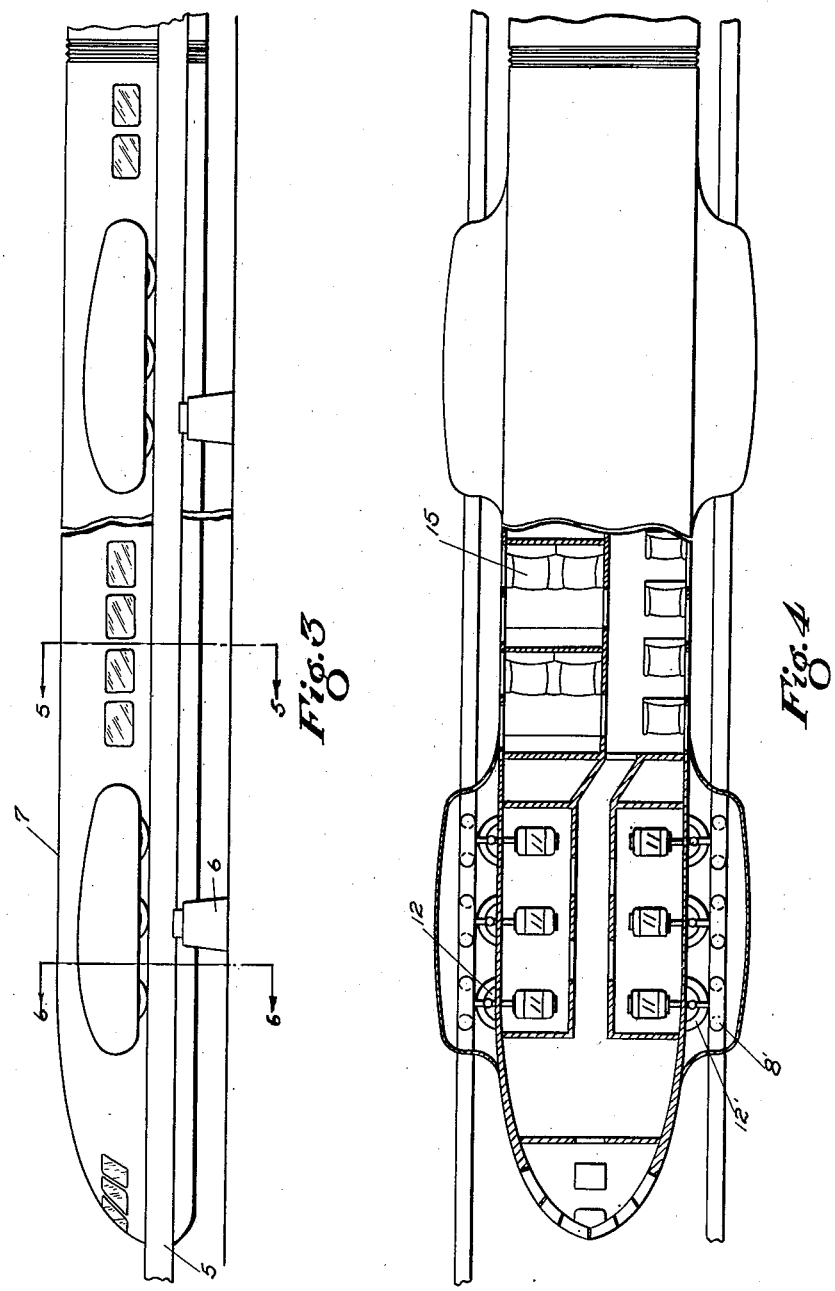
INVENTOR:
Rudolf Meyer,
BY:
Pierce, Scheffler & Parker,
Attorneys.

Patented Apr. 4, 1950

2,503,120

UNITED STATES PATENT OFFICE 2,503,120

HIGH-SPEED RAIL VEHICLE

Rudolf Meyer, Zurich, Switzerland

Application August 7, 1947, Serial No. 767,077
In Germany June 18, 1940

Section 1, Public Law 690, August 8, 1946
Patent expires June 18, 1960

2 Claims. (Cl. 104—247)

This invention relates to vehicle construction and in particular to an improved construction for a vehicle adapted to run on parallel spaced rigid rails.

With the conventional railway rolling stock now in use wherein the vehicle body is spring mounted on wheeled trucks that roll on spaced rails located substantially at ground level, the center of gravity of the vehicle is, necessarily, located far above the support plane where the wheels engage the tracks. Because of this, the wheels must be designed to permit a limited amount of side-play on the rails and provided with flanges at their inner edges to limit the latter motion. On conventional wheels, provision is made for a lateral movement of from ten to twenty millimeters, and the vehicle while running moves back and forth in a lateral direction in a sinusoidal cyclic manner. According to the Klingel analysis, which may be found in "Organ für die Fortschritte des Eisenbahnwesens," 1883, vol. 4, page 115, the wavelength $l$ of this cyclic motion may be expressed by the equation $$l = 2\pi \sqrt{\frac{r}{2} \frac{s}{\gamma}}$$

wherein $r$ is the wheel radius, $s$ the width of the running surface (rim) of the wheel from the flange to the outer edge, and $\gamma$ the conicity of the running surface.

The lateral motion of the vehicle results in an uneven running of the vehicle, which is undesirable and the unevenness increases as the speed increases.

The object of this invention is to provide a vehicle construction which will run most evenly on the rails even at very high speeds without lateral play and is attained by raising the rails to a point considerably off the ground and locating the wheel axles at a distance above the center of gravity of the vehicle equal to the wheel radius. The contact or rolling plane of the wheel rim on the rails thus passes through the center of gravity of the vehicle. With this improved construction, as will be clearly shown by a force analysis at a later point in this description the forces applied from the vehicle through the wheels are equal at both sides of the vehicle irrespective of the speed of the vehicle, the radius and banking angle of curved portions of the trackage, and also irrespective of the lateral mass effects on the straight portions of the trackage. Furthermore, during a change in direction of the vehicle in going from a straight to a curved portion of the track, or vice versa, the axle or wheel loading forces at each side of the vehicle, increase or decrease, respectively, in an equal and uniform manner as distinguished from the undesirable effect experienced with the already known vehicle constructions wherein these forces increase or decrease respectively in an unequal manner at opposite sides of the vehicle.

The improved vehicle construction according to this invention, has the further desirable characteristic in that no moments (force × lever arm) act on the force application points of the wheels, but on the contrary only the forces themselves, and flanged guiding of the wheels is thus no longer necessary, the guiding action being furnished according to the invention by horizontally running guide wheels which contact the rail also substantially at the horizontal plane through the center of gravity of the vehicle. These guide wheels likewise do not undergo any appreciable moments, but on the contrary experience only forces so that the vehicle is guided on the rails without lateral play and therefore has the additional advantage of quiet running even at high speeds.

In the accompanying drawings; Fig. 1 is a diagrammatic presentation of the various force factors attendant to a rail vehicle of conventional construction on a straight level trackway; Figs. 2a, 2b illustrate the relationship in these forces for the rail vehicle of Fig. 1 when on a banked curve; Fig. 2c illustrates the relationship in the force factors for a vehicle made in accordance with this invention when on a banked curve; and Figs. 3–6 show a preferred vehicle construction embodying the design principles set out in Fig. 2c. As to these, Fig. 3 is a side elevation of the improved vehicle on the trackway; Fig. 4 is a top plan view, the front section being cut away to show a part of the vehicle interior; Fig. 5 is a transverse section through the passenger section of the vehicle taken on line 5—5 of Fig. 3 and drawn to a larger scale; and Fig. 6 is a similar sectional view on line 6—6 through the driving motor compartment. Fig. 7 is a transverse section similar to Fig. 6 illustrating a modified construction which enables the guide wheels to contact the rails at exactly the center of gravity of the vehicle.

In further explanation of the principles which underlie the present invention, reference is now made to the dynamic force diagram of Fig. 1 appertaining to a vehicle construction already known wherein the vehicle body 1 is carried on trucks 2 that include flanged wheels 3 which run on the rails 4. In the diagram C designates the center of gravity which is plainly far above the point of contact between the wheels 3 and rails 4; G is the weight of the vehicle; Z the centrifugal force present on a curve, or any lateral force applied to the vehicle on a straight-away, $s$ is the distance between the rails; and $h$ designates the distance from the contact plane between the wheels and rails to the center of gravity of the vehicle.

Under static conditions:

$$Q1 + Q2 = G$$

where Q1 and Q2 are the wheel loading forces at each side of the vehicle.

Under dynamic conditions:

$$Q2s + Zh - G\frac{s}{2} = 0$$

or:

$$Q2 = \frac{G\frac{s}{2} - Zh}{s} = \frac{G}{2} - Z\frac{h}{s}$$

Accordingly:

$$Q1 = G - Q2 = \frac{G}{2} - Z\frac{h}{s}$$

It is thus recognized from the above force analysis that Q1 will be greater the greater G, Z and $h$ become, and the smaller $s$ is. Q1 is greater than Q2 by an amount $$Z\frac{h}{s}$$

while Q2 is smaller by the same amount. A constant change in the wheel loading will therefore occur in vehicles of the general construction shown in Fig. 1 both in traveling along straight-away portions of the track as well as around curves, and also in changing over from a straight-away to a curve and vice versa.

The unequal wheel loadings Q1 and Q2 experienced by a vehicle of the construction shown in Fig. 1 on a banked curve is pictured graphically in Figs. 2a and 2b, it being evident from Fig. 2b that the force vector Q1 is greater than force vector Q2.

Consider now the force diagram of Fig. 2c where according to the invention the contact plane of the wheel rim on the rail passes through the center of gravity C of the vehicle. In this case $h$ becomes zero and hence:

$$Q1 = Q2 = \frac{G}{2}$$

which means that the wheel loadings at each side of the vehicle remain equal in magnitude, and increase and decrease uniformly. From Fig. 2c it will be evident that under the assumed attitude of the vehicle wherein the latter is rounding a banked curve, lateral forces will be created at the contact plane between the wheels and the rails and must be absorbed there. For this purpose horizontally running guide wheels are used, these being arranged with their line of contact with the rails located as close as practical to the horizontal plane through the center of gravity of the vehicle.

Referring now to Figs. 3–6, the trackway is constituted by a pair of parallel spaced rails 5, 5' made of suitable material preferably in the form of hollow rigid rectangular beams of metal or concrete. The rails are supported at spaced intervals (for example 10 meters) on posts 6, 6', the height of the rails from the ground being at least sufficient to clear the underside of the vehicle body 7 which is preferably of an elongated streamlined shape to minimize head-on wind resistance.

The vehicle body is supported on rails 5, 5' by a plurality of wheels 8 each keyed or otherwise secured on horizontal axles 9 that are mounted resiliently on springs in casings 10. Each of the wheel axles 9 is preferably driven from an electrical motor 11 that can receive its power from a motor generator unit carried on the vehicle itself or the power can be collected on a pantograph or from a "third" rail. In the illustrated construction, the wheels 8 are placed in groups of six each at the front and rear of the vehicle, there being three on each side of the vehicle in each group. As previously explained the support plane x–x where the wheels 8 engage the top face of the rails 5, 5', passes through the center of gravity C of the vehicle and hence the axles 9 will be located above the plane x–x by a distance equal to the radius of the wheels 8.

A guide wheel 12 rotatable in a horizontal plane is associated with each of the wheels 8 to absorb the lateral forces previously mentioned. The guide wheels 12 are mounted on vertical axles 13 that are carried resiliently by springs in casings 14, and the rim portions of the wheels 12 are urged through their spring mounted axles in a resilient manner against the side faces of the rails 5, 5' as close as practical to the top face of the rails so as to establish a rolling guide contact as near as possible to the plane x–x. If desired, the rails 5, 5' could be designed so as to present a side face lying in the plane x–x in which case the guide wheels 12 would establish a rolling contact in such plane, as shown in Fig. 7.

The resilient mountings for the wheels 8 and the wheels 12 permit these wheels to absorb by yielding action, respectively, any vertical and horizontal irregularities in the rails 5, 5' without departing from the underlying principle of this invention of operating the vehicle along the rails without a specific provision for side play. In order to accommodate the vertical yielding action of the wheels 8, the horizontal drive axles 9 include inner and outer yieldable couplings of conventional design between the motors 11 and the wheels 8, the couplings being indicated generally by numerals 16.

If desired, the spring mountings for the vertical and horizontal running wheels may be given a progressive characteristic which adjusts itself in accordance with the vehicle loading.

Since the wheels 8 and 12 do not require side flanges, the running surfaces of these wheels can be made arcuate so as to reduce the contact area between the rails and wheels, and can also be made resilient with respect to their supporting axles if desired by the inclusion of rubber insert rings between the rims and axles. The wheels can also, as shown in the drawing, be provided with rubber tires 8', 12' with inner tubes, of the same construction used on present day automobiles so as to further improve the smoothness in running.

The seats 15 in the vehicle should be so placed that the passengers will be seated substantially in the plane x–x through the center of gravity C. If this be done, the passengers will ride in a most comfortable manner and will experience practically no feeling whatsoever of motion. The passengers can board and leave the vehicle through entrances which have not been shown and these can be placed at the side of the vehicle body in the conventional manner or constituted by hatches underneath the vehicle with suitable stairways that can be lowered to ground level. If a large number of passengers are to be carried, a number of cars can be coupled together to form a train with the motors in the several cars controlled by an operator in the lead car.

In conclusion it will be evident that a railway system built in accordance with the principles of this invention has unquestionable advantages over the type now in general use that is shown in Fig. 1. A system according to the invention offers smoother running, can be operated safely at higher speeds than now possible and can be installed at a lower cost since the elevated track system using spaced posts is much cheaper to build than the presently used roadbed and requires less maintenance.

Furthermore, it is to be understood that the appended claims are not to be limited to the specific illustrated embodiment, since changes in the construction and arrangement of parts, and the power drive for the wheels can be varied without departing from the spirit and scope of the invention.

I claim:

1. A vehicle adapted to run at high speeds on a pair of spaced rigid rails, said vehicle comprising, a body, and a plurality of vertically running wheels spaced longitudinally of said body and positioned laterally on opposite sides thereof, the axes of said wheels being disposed above the center of gravity of the vehicle by an amount which corresponds to the wheel radius to thereby locate the wheel supporting face of the rails at the center of gravity of the vehicle.

2. A rail vehicle as defined in claim 1 wherein the interior of the vehicle body is provided with seats positioned to seat the passengers at the center of gravity of the vehicle.

RUDOLF MEYER.

REFERENCES CITED

The following references are of record in the file of this patent:

UNITED STATES PATENTS

| Number | Name | Date |
|---|---|---|
| 1,422,394 | Wagner | July 11, 1922 |
| 1,825,468 | Miller | Sept. 29, 1931 |

FOREIGN PATENTS

| Number | Country | Date |
|---|---|---|
| 222,584 | Great Britain | Oct. 6, 1924 |
| 549,736 | Germany | Apr. 14, 1932 |

OTHER REFERENCES

Ser. No. 316,577, Fuchs (A. P. C.), pub. May 11, 1943.